(12) United States Patent
Koeder et al.

(10) Patent No.: US 8,622,568 B2
(45) Date of Patent: Jan. 7, 2014

(54) POWER TOOL, PARTICULARLY A HAND-HELD POWER TOOL

(75) Inventors: Thilo Koeder, Gerlingen (DE); Georg Stellmann, Ludwigsburg (DE); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/141,455

(22) PCT Filed: Oct. 22, 2009

(86) PCT No.: PCT/EP2009/063900
§ 371 (c)(1),
(2), (4) Date: Sep. 12, 2011

(87) PCT Pub. No.: WO2010/072442
PCT Pub. Date: Jul. 1, 2010

(65) Prior Publication Data
US 2011/0310594 A1    Dec. 22, 2011

(30) Foreign Application Priority Data
Dec. 22, 2008 (DE) .......................... 10 2008 055 067

(51) Int. Cl.
*B25B 23/18* (2006.01)
(52) U.S. Cl.
USPC ............. 362/119; 362/33; 362/109; 362/253; 362/578

(58) Field of Classification Search
USPC ................... 362/33, 109, 119, 253, 577–578; 30/165
See application file for complete search history.

(56) References Cited

U.S. PATENT DOCUMENTS

| 3,504,716 A | 4/1970 | Bush et al. | |
| 4,833,782 A * | 5/1989 | Smith | ............................. 30/392 |
| 5,010,652 A | 4/1991 | Miletich | |
| 2008/0229589 A1 | 9/2008 | Bone | |

FOREIGN PATENT DOCUMENTS

| CN | 1310915 A | 8/2001 |
| CN | 1484193 A | 3/2004 |
| CN | 1538151 A | 10/2004 |
| DE | 10 2006 052 808 A1 | 5/2008 |
| WO | 2008/151872 A1 | 12/2008 |

OTHER PUBLICATIONS

International Search Report corresponding to PCT Application No. PCT/EP2009/063900, mailed Apr. 7, 2010 (German and English language document) (5 pages).

* cited by examiner

*Primary Examiner* — Stephen F Husar
*Assistant Examiner* — Meghan Dunwiddie
(74) *Attorney, Agent, or Firm* — Maginot, Moore & Beck

(57) ABSTRACT

A power tool includes a lighting unit directed towards a detection field on a workpiece side, and a detection system that emphasizes the contrast between a marking applied to an underlying surface and the underlying surface.

18 Claims, 3 Drawing Sheets

POWER TOOL, PARTICULARLY A HAND-HELD POWER TOOL

This application is a 35 U.S.C. §371 National Stage Application of PCT/EP2009/063900, filed Oct. 22, 2009, which claims the benefit of priority to Application Serial No. DE 10 2008 055 067.1, filed Dec. 22, 2008 in Germany, the disclosures of which are incorporated herein by reference in their entirety.

The disclosure relates to a power tool, particularly a hand-held power tool.

BACKGROUND

Power tools of the aforementioned type are known from DE 10 2006 052 808 A1. In this case, they are designed as jigsaws, wherein the saw blade is driven in a stroke motion and, in the case of exclusively stroke motion drive, operates in the standard working mode, i.e. without further rotary and pivoting motions, with the plane of the saw blade aligned in the longitudinal direction of the machine. If a pivoting motion, about a pivot axis lying transversely in relation to the plane of the saw blade, is superposed on the stroke motion drive, the jigsaw operates in the pendulum stroke mode. A further operating mode is obtained if the jigsaw is to be operated as a so-called "scrolling jigsaw", in which case, in addition to the stroke drive of the saw blade, there is obtained an ability to rotate about a rotary axis extending in the direction of its stroke axis, such that the respective working direction can be set substantially through the rotation of the saw blade.

If this is effected with the aid of a detection system, by means of which a working line predefined on the workpiece side can be acquired, the acquired data can be used to control a positioning device, by means of which the saw blade can be moved about its rotary axis and therefore set to a rotary position that follows the working line. The jigsaw can therefore be operated semi-autonomously, since it remains for the user merely to assume the feed and to support the reaction forces, whereas the guiding along the working line is assumed by the detection system.

A prerequisite for such a semi-autonomous working mode is the perfect acquisition of the working line by means of a sensor system, belonging to the detection system and realized, if appropriate, as a camera, in the region of a detection field that comprises the work region of the saw blade on the workpiece and to which the sensor system is aligned.

Although this region is usually illuminated by a lighting unit that, like the sensor system, is disposed on the machine side, a working line constituted by an applied marking, for example a pencil mark, cannot always be perfectly recognized and unambiguously distinguished from the background, particularly in the case of strongly patterned or grained surfaces of the respective workpiece.

SUMMARY

The disclosure is based on the object of ensuring an undisturbed, reliable working mode, particularly for power tools, including when used semi-autonomously, through an improved capacity to recognize and acquire the respective working line.

According to the disclosure, this is achieved through the features described herein.

For this, in the case of the disclosure, use is made of the fact, primarily, that the lighting unit has a light source whose light includes a wavelength range that corresponds to the spectral wavelength range of the marking, such that the marking, and therefore the working line constituted by the latter, is emphasized by the increased reflectivity, this being the case, in particular, when the waveband of the light source corresponds mainly to the spectral waveband of the marking and the marking preferably has a main reflection spectrum that is different than the respective background.

This can be achieved, in particular, in that the spectral waveband of the light source lies mainly in the black light range or in the so-called NIR range, such a marking being able to be applied, in particular, for example, by a black light pen for the black light range or, for the NIR range, by a color pen that, in particular, absorbs in the NIR range. The use of such marking pens for working lines to be applied on workpieces also constitutes a solution to the aforementioned object, independently of other measures to improve the contrast of a working line relative to a background.

It further proves to be expedient, both for the black light range and for the NIR range, if the spectral wavelength range of the light emitted by the light source, as part of the detection system, is delimited, by means of a filter, to a wavelength range that lies in the black light range or in the NIR range, such that masking out of the non-conforming wavelength ranges ensues.

Also expedient is a corresponding filtering of the light by the sensor system of the detection system, a filter being connected in front of the sensor system in this case, which filter is transmissive substantially only within the frequency band bounded by the black light range or the NIR range, such that other frequency ranges, and therefore also grains and patterns of the surface located in the detection field, are masked out. The working line constituted by the marking appears bright in the case of markings in the black light range, in particular white on a dark background and, in the case of markings in the NIR range, as a dark line on a light background, in a highly contrasting manner. In both cases, the design, according to the disclosure, of the detection system of the power tool also enables working in the case of the surroundings being poorly lit, to the extent of being dark, the light source belonging to the detection system not representing any special resource input and being able to be constituted by an LED that includes, in particular, the spectral waveband of the marking.

If the ambient lighting already includes a wavelength range, in the required intensity, that corresponds to the spectral wavelength range of the markings, the light source assigned to the detection system can also be constituted by the ambient lighting.

Where reference is made above to the black light range or to the NIR range, a wavelength range of approximately 350 to 400 nm is considered in respect of the black light range and, in respect of the NIR range, a wavelength range of, in particular, above 800 nm, in which, as in the black light range—in the case of, for example, black light pens being used—a high reflectivity is given for most materials, a lighting by means of, for example, an IR LED constituting an advantageous and favorable solution for the NIR range.

An increase in contrast, as achieved with the solution considered above, can also be achieved within the scope of the disclosure by using fluorescing materials for the marking. In particular, the fluorescing effect applies if the lighting of the marking constituting the working line—particularly in the detection field—is effected in a pulsed manner.

A pulsed lighting also proves to be expedient if, as discussed above, markings are used whose spectral wavelength range lies mainly in the black light range or in the NIR range.

In respect of the lighting of fluorescing markings, the wavelength range of the marking has no outstanding significance. Through the lighting of the fluorescing marking with pulsed light, an increased contrast is achieved in that, in particular, owing to the luminosity that is also obtained in the lighting pauses in the case of pulsed lighting, a clear distinction from the background material ensues, since its brightness value varies substantially more strongly according to the pulsing. The working line constituted by the marking can be easily detected through evaluation of this variation.

The increase in contrast, sought according to the disclosure, for the recognizability and highlighting of the working line, constituted by the marking, relative to the background can also be improved in the visible light range through the use of filters, particularly band filters, but this cannot always be achieved to the required extent in the case of particularly difficult base materials such as, for example, flecked kitchen worktops. Here, according to the disclosure, a possibility for improvement consists in that, depending on the case, work is performed with light of differing wavelength ranges as a light source and active lighting for the marking constituting, in particular, the respective working line, this being easily realized in that a plurality of differently colored LEDs or multi-color LEDs are used, and these are switched over, in an initial calibration step, between the differing wavelength ranges, such that the optimal contrast ratio between the marking, in particular the working line, and the background can be determined and set through trial.

In principle, it is further within the scope of the disclosure to perform color segmentation in the observed detection field through image processing. With the color of the run being known, the complete background can be masked out in this case, which, however, necessitates a corresponding computing input and in each case requires matching to the respective marking color, which is normally known in any case, however, in the case of marking pens being used.

The contrasting according to the disclosure can be yet further improved, in particular, and in practically all cases, in that, after acquisition of the marking by means of the sensor system, the color segmentation of the marking is analyzed, particularly through digital image processing, and a selective adaptation or setting is effected to match the determined spectral waveband of the marking.

BRIEF DESCRIPTION OF THE DRAWINGS

Further advantages and expedient embodiments are given by the claims, the description of the figures and the drawings, wherein:

DETAILED DESCRIPTION

Figure 1:
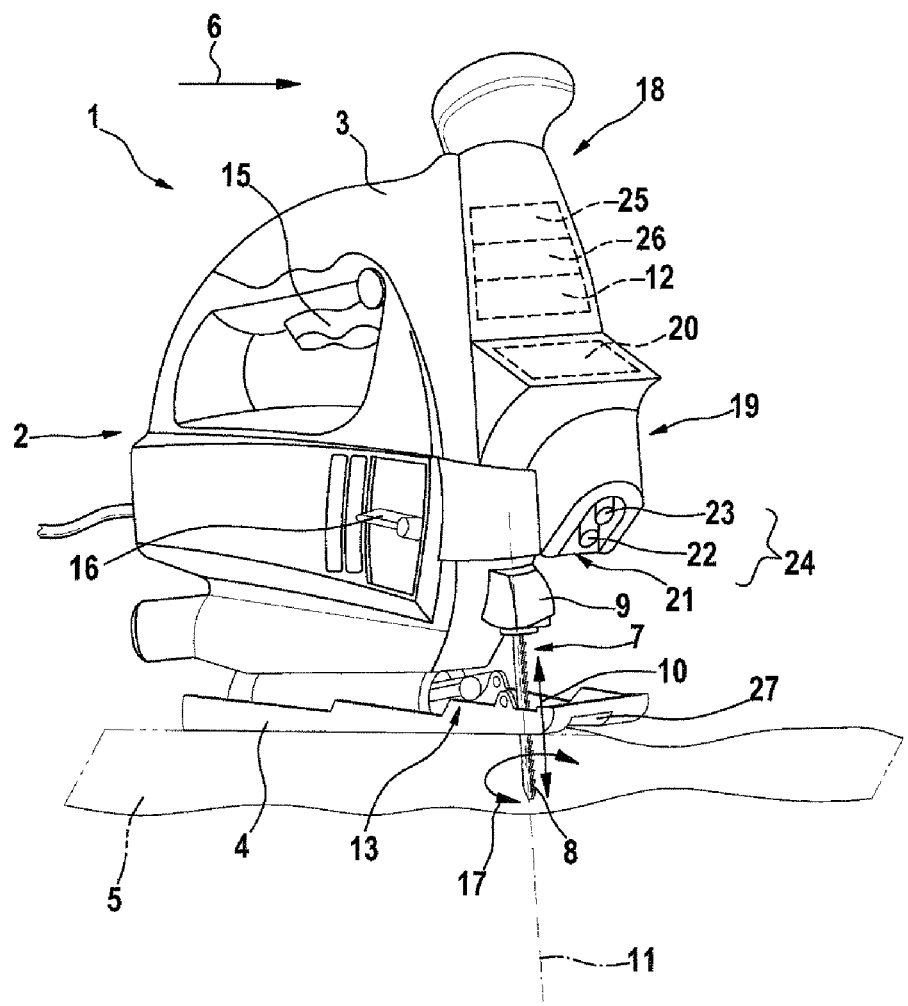
FIG. 1 shows a highly schematic representation of a power tool according to the disclosure in the form of a hand-held, electrically driven jigsaw, which, on the front side, has a sensor system and a lighting source for the observation of a detection field covering the work region of the saw blade on the workpiece.

FIG. 1 shows a jigsaw 2 as an example of a hand-held power tool according to the disclosure. Its housing 3 is displaceably supported, via a foot plate 4, on a workpiece 5. In its region that is at the front in respect of the working direction 6, the jigsaw 2 is provided with a working tool 7 in the form of a saw blade 8. The saw blade 8 is disposed in a tool holder 9 and driven so as to be movable in the stroke direction 10. Further, by means of a rotary drive 12 that is represented merely schematically, the saw blade 8 can be rotated about a rotary axis 11 extending in the stroke direction 10. Further indicated is a drive device 13, which is located at the back side in relation to the saw blade 8 and by means of which the saw blade 8 can be swiveled about a pivot axis, not represented, extending transversely in relation to the rotary axis 11 and transversely in relation to the working direction 6.

Owing to the structure described, the jigsaw 2 can be operated in differing operating modes. One of these is the standard working mode, with the saw blade 8 remaining aligned in the working direction 6. A further manner of operation is the so-called pendulum stroke mode, wherein, by means of the drive device 13 and in a manner superposed on the stroke motion (stroke direction 10), the saw blade 8 is moved in pendulum fashion about a pivot axis, not shown, extending transversely in relation to the rotary axis 11 and transversely in relation to the working direction 6.

In a third manner of operation, use is made of the ability of the saw blade 8 to rotate about the rotary axis 11, and the jigsaw 2 can be operated, in semi-autonomous mode, as a so-called "scrolling jigsaw".

Figure 2:
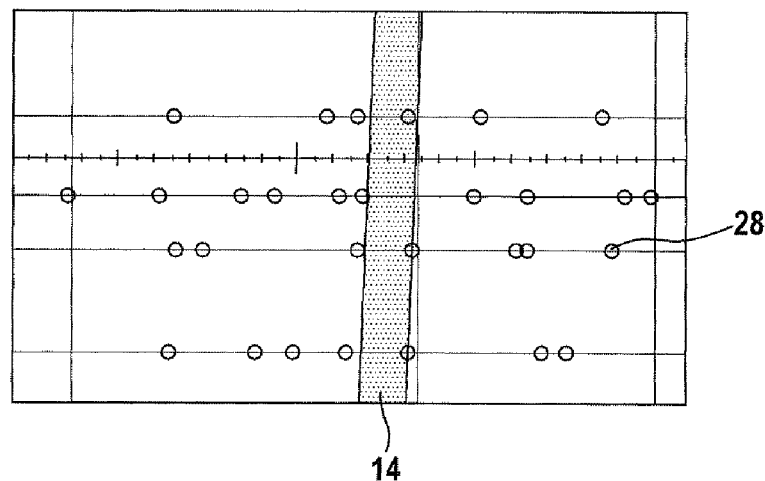
FIG. 2 shows an image portion of a detection field, in plan view.

This means that the user holding the jigsaw 2 assumes substantially only the support, roughly aligned to a working line 14 to be followed, indicated in FIG. 2, and the feed of the jigsaw 2, but with the exact positioning of the jigsaw 2, aligned to the working line 14 and corresponding to the latter, being effected through the rotary moving and alignment of the saw blade 8.

The jigsaw 2 is switched on and off by means of a switching device 15, and switched over between the individual operating modes by means of a switching arrangement 16.

In the region of a front side 18, the housing 3 of the jigsaw 2 is provided with a nose-shaped extension 19, which projects forward over the saw blade 8 and the saw blade holder 9 and which accommodates a display 20, for information to the user, that is offset toward the front surface of the front side 18. On the underside, as represented symbolically, the extension 19 has a receiving window 21 for a lighting arrangement having a light source 22, and further for a sensor system 23, particularly in the form of a camera.

The sensor system 23, together with the lighting unit comprising the light source 22, if appropriate, constitutes a constituent part of a detection system 24, to which there are assigned at least one computing unit 25 and one evaluation and control unit 26, for the purpose of processing the data acquired by the sensor system 23 and converting said data into actuating commands.

The saw blade 8 acting upon the workpiece 5 goes through the foot plate 4 in the region of a cut-out 27, which is only partially visible, the cut-out 27 at least partially bounding a detection surface, which lies in the field of view of the light source 22 and of the sensor system 23, and through which there extends the marked working line 14, indicated in FIG. 2, that is to be acquired by the detection system 24. The acquired values are converted, by means of the computing unit 25 and the evaluation and control unit 26, inter alia, into actuating commands for the rotary drive 12 of the saw blade 8, in such a way that the saw blade 8 is aligned to the working line 14 in each case and, via the saw blade 8, the jigsaw 2 follows the working line 14.

This requires a perfect acquisition of the working line 14 by means of the sensor system 23 realized, in particular, as a camera, irrespective of whether, as can be seen from FIG. 2, the workpiece 5 has, for example, a flecked surface that, owing to its uneven pattern, firstly allows only a disturbed recognition of the working line 14 since, in addition to the working line 14, further points of the flecked surface are also recognized as marking points 28, which has the same or a similar contrast in relation to the background as the working line 14 has at the edge, such that, ultimately, the line recognition of the working line 14 is disturbed.

The disclosure is aimed at such a contrast, being an edge-defined contrast of the working line 14 in relation to the background, which disclosure starts from the fact that the light source 22 has a waveband that mainly overlaps with the wavelength range of the marking such that, by means of the resultant increased reflection, the marking, and therefore the working line 14, stands out in an optically perfect manner. The starting point for this is a marking that, at least substantially, has a wavelength range belonging to the black light range or to the NIR range and that can be applied, for example, by a black light pen—for the black light range—or, for the NIR range, by a color pen that is particularly absorbent in the NIR range.

Figure 3:
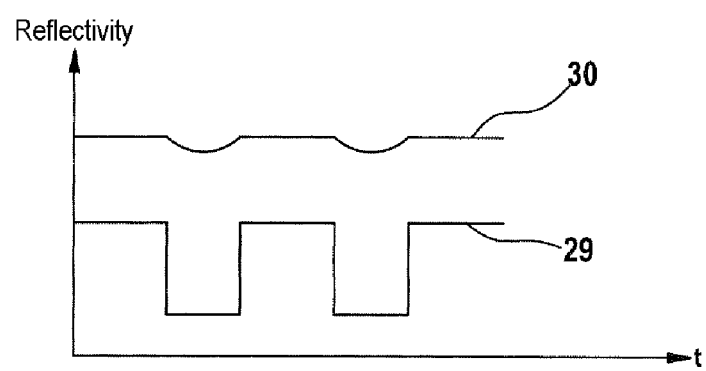
FIG. 3 shows a diagram illustrating the reflectivity of fluorescing materials in the case of pulsed lighting.

The increased contrasting for a working line through use of a fluorescing marking material is illustrated by FIG. 3. The fluorescing material normally already has an increased reflectance relative to the background, such that, when illuminated, it stands out from the background. As illustrated in FIG. 3, this effect is intensified in the case of pulsed lighting. For this, FIG. 3 shows, at the bottom, the starting situation with pulsed lighting for the background without a fluorescing marking and, as illustrated by the line trace 29, a clear drop in the reflectivity ensues in the lighting pauses. The line trace 30 above it shows the situation with an applied fluorescing marking; owing to the fluorescence of the marking, in the lighting pauses the reflectivity, and therefore the brightness value, remains substantially the same over time.

Figure 4:
FIG. 4 shows a portion from a detection surface, in plan view, under black light.

FIG. 4 is an embodiment example of how a marking, illustrated here as a character 31, is contrasted relative to a background 32 if the marking is applied, for example, by means of a black light pen (wavelength range approximately 300 to 400 nm) and is irradiated with light, particularly of a corresponding wavelength range. This effect can be increased in that the sensor system, which is constituted, in particular, by a camera, operates with a wavelength filter, particularly a bandpass filter, which is placed in front and which, in particular, is transmissive in this wavelength range, i.e. the black light range, and masks out other wavelength ranges, such that, as shown here, the character 31 is represented as clearly highlighted on the dark background 32.

Figure 5:
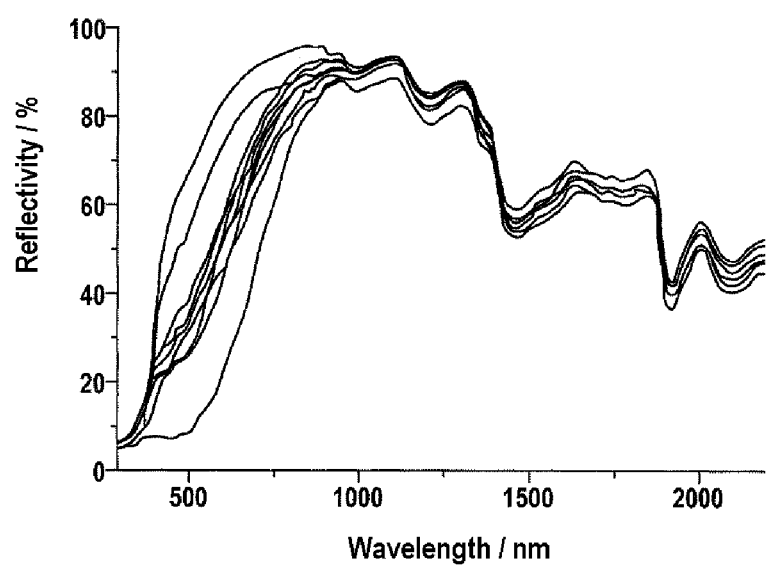
FIG. 5 shows a schematic representation of the reflectivity of differing woods over the wavelength.

FIG. 5 shows the reflectivity for differing wood types as a function of the respective wavelength, and makes it clear that here, particularly in the range of the lower wavelengths, there are clear differences in the reflectivity. These differences can be used, particularly in combination with an active lighting, to set the wavelength range thereof to the wavelength range of the corresponding wood type, in order to improve the contrast ratio and thus clearly emphasize markings. The information obtained in relation to the wood type can also be used otherwise, thus, in particular, for the purpose of setting the working values for the tool to the respective material of a workpiece. In respect of a jigsaw, these are, in particular, the stroke rate and the feed rate. If appropriate, the users can be also given instructions, particularly in the display 20, concerning the tool to be selected in each case or, through plausibility checking, the tool used in each case can also be verified for its suitability for processing of the respective material.

The invention claimed is:

1. A power tool, particularly a hand-held power tool, comprising:
    a lighting unit aligned to a detection field on a workpiece side; and
    a detection system for a marking, on the workpiece side, that contrasts with the workpiece surface, by means of a sensor system provided on the machine side,
    wherein the lighting unit is part of the detection system and has a light source whose light includes a wavelength range that corresponds to the spectral wavelength range of the marking, and
    wherein the light source has a main waveband that overlaps with the spectral wavelength range of the marking.

2. The power tool as claimed in claim 1, wherein the spectral wavelength range of the light source lies mainly in the black light range.

3. The power tool as claimed in claim 1, wherein the spectral wavelength range of the light emitted by the light source lies mainly in the NIR range.

4. The power tool as claimed in claim 1, wherein the spectral wavelength range of the light emitted by the light source is delimited by a filter to a predefined wavelength range in the black light range or the NIR range.

5. The power tool as claimed in claim 1, wherein a filter connected in front of the sensor system, which filter is transmissive substantially only to light having wavelengths that lie within the frequency band bounded by the black light range or the NIR range.

6. The power tool as claimed in claim 1, wherein the spectral wavelength range of the marking corresponds to a range of higher reflectivity.

7. The power tool as claimed in claim 1, wherein the detection system is configured to detect a fluorescing marking.

8. The power tool as claimed in claim 1, wherein at least one of the light source and the sensor system includes a filter that is configured to mask out a range of the spectral frequency band.

9. The power tool as claimed in claim 8, wherein spectral wavelength ranges corresponding to a pattern on the workpiece surface are masked out by the filter.

10. The power tool as claimed in claim 1, wherein the lighting unit includes a plurality of light sources configured to generate light having differing spectral wavelength ranges, and one or more of the plurality of light sources is selectively activated for the purpose of maximizing a contrast of the marking in relation to a background of the workpiece surface.

11. The power tool as claimed in claim 1, wherein the sensor system performs color segmentation by digital image processing such that a background on the workpiece surface is at least substantially masked out in relation to the marking.

12. The power tool as claimed in claim 1, wherein the sensor system is connected to an evaluation unit that determines the spectral wavelength range of the marking.

13. A marking device, comprising:
    a means for marking, particularly for a working line to be applied on the workpiece side and to be followed by means of a power tool, the means of a power tool including (i) a lighting unit aligned to a detection field on a workpiece side, and (ii) a detection system for a marking, on the workpiece side, that contrasts with the workpiece surface, by means of a sensor system provided on the machine side, the lighting unit is part of the detection system and includes a light source whose light includes a wavelength range that corresponds to the spectral wavelength range of the marking, wherein the means for marking, having its spectral waveband lying in the black light range or in the NIR range, is to be applied by a black light pen or by a color pen that absorbs in the NIR range.

14. A package set for power tools, particularly hand-held power tools, comprising:
   at least one power tool including (i) a lighting unit aligned to a detection field on a workpiece side, and (ii) a detection system for a marking, on the workpiece side, that contrasts with the workpiece surface, by means of a sensor system provided on the machine side, the lighting unit is part of the detection system and includes a light source whose light includes a wavelength range that corresponds to the spectral wavelength range of the marking;
   marking pens;
   filters that are transmissive only to portions of the frequency band of the spectral wavelength range; and
   tools for the power tool.

15. A power tool for use with a workpiece that has a workpiece surface with a marking thereon, with the marking contrasting with the workpiece surface, comprising:
   a detection system for the marking including (i) a lighting unit configured to generate a light that is aligned to a detection field on the workpiece surface, and (ii) a sensor system configured to sense the marking,
   wherein the lighting unit has a light source configured to generate the light, and the light includes a wavelength range that corresponds to the spectral wavelength range of the marking, and
   wherein at least one of the light source and the sensor system includes a filter that is configured to mask out a range of the spectral frequency band.

16. The power tool as claimed in claim 15, wherein spectral wavelength ranges corresponding to a pattern on the workpiece surface are masked out by the filter.

17. The power tool as claimed in claim 15, wherein the lighting unit includes a plurality of light sources configured to generate light having differing spectral wavelength ranges, and one or more of the plurality of light sources is selectively activated for the purpose of maximizing a contrast of the marking in relation to a background of the workpiece surface.

18. A power tool for use with a workpiece that has a workpiece surface with a marking thereon, with the marking contrasting with the workpiece surface, comprising:
   a detection system for the marking including (i) a lighting unit configured to generate a light that is aligned to a detection field on the workpiece surface, and (ii) a sensor system configured to sense the marking,
   wherein the lighting unit has a light source configured to generate the light, and the light includes a wavelength range that corresponds to the spectral wavelength range of the marking, and
   wherein the sensor system performs color segmentation by digital image processing such that a background on the workpiece surface is at least substantially masked out in relation to the marking.

\* \* \* \* \*